(12) United States Patent
Liderman et al.

(10) Patent No.: US 11,443,023 B2
(45) Date of Patent: *Sep. 13, 2022

(54) DISTRIBUTED PROFILE AND KEY MANAGEMENT

(71) Applicant: VMware, Inc., Palo Alto, CA (US)

(72) Inventors: Eugene Liderman, Olney, MD (US); Jonathon Deriso, Cumming, GA (US); William Thomas Hooper, Norcross, GA (US); Sagar Date, Alpharetta, GA (US); Tejas Mehrotra, Santa Clara, CA (US); Stephen Turner, Atlanta, GA (US); Amogh Datar, Atlanta, GA (US); Dipanshu Gupta, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 15/685,299

(22) Filed: Aug. 24, 2017

(65) Prior Publication Data

US 2019/0065725 A1    Feb. 28, 2019

(51) Int. Cl.
*G06F 21/34* (2013.01)
*H04W 12/06* (2021.01)
(Continued)

(52) U.S. Cl.
CPC .............. *G06F 21/34* (2013.01); *G06F 21/33* (2013.01); *H04L 9/3234* (2013.01);
(Continued)

(58) Field of Classification Search
CPC ....... G06F 21/34; G06F 21/33; H04L 9/3268; H04L 9/3234; H04L 63/0823; H04L 9/3213; H04W 12/06; H04W 12/04
See application file for complete search history.

(56) References Cited

U.S. PATENT DOCUMENTS 9,021,348 B1 * 4/2015 Meschkat ............. G06F 16/958
715/235
9,668,136 B2 * 5/2017 Mistry ................. H04W 12/068
(Continued)

OTHER PUBLICATIONS

Entrust Datacard, Mobile Derived PIV/CAC Credential—A Complete Solution for NIST 800-157, Nov. 15, 2014, pp. 1-15. (Year: 2014).*

(Continued)

*Primary Examiner* — Luu T Pham
*Assistant Examiner* — Canh Le
(74) *Attorney, Agent, or Firm* — Thomas | Horstemeyer, LLP

(57) ABSTRACT

Disclosed are various examples for distributed profile and key management. In one example, a client device can include an agent application and a PIV-D application. The agent application can receive a partially populated device profile generated by a management service to configure a setting on the client device. The PIV-D application can generate a derived credential and provide the derived credential to the agent application. The agent application can modify the partially populated device profile to include the credential to create a fully populated device profile and configure the client device in accordance with the fully populated device profile.

17 Claims, 12 Drawing Sheets

(51) Int. Cl.
*H04L 9/40* (2022.01)
*H04L 9/32* (2006.01)
*G06F 21/33* (2013.01)
*H04W 12/04* (2021.01)

(52) U.S. Cl.
CPC .......... *H04L 9/3268* (2013.01); *H04L 63/062* (2013.01); *H04L 63/0823* (2013.01); *H04W 12/04* (2013.01); *H04W 12/06* (2013.01); *H04L 9/3213* (2013.01)

(56) References Cited

U.S. PATENT DOCUMENTS

| | | | | |
|---|---|---|---|---|
| 9,686,278 | B1* | 6/2017 | Rodgers | H04L 63/0281 |
| 9,736,145 | B1* | 8/2017 | Hayes | H04L 63/0846 |
| 9,992,189 | B2 | 6/2018 | Hayes et al. | |
| 10,122,577 | B1* | 11/2018 | Rykowski | H04L 41/0806 |
| 2017/0094509 | A1* | 3/2017 | Mistry | H04L 63/083 |
| 2017/0288883 | A1 | 10/2017 | Goverdhan et al. | |
| 2017/0364956 | A1 | 12/2017 | Dhar et al. | |
| 2018/0034822 | A1 | 2/2018 | Mistry | |
| 2018/0041494 | A1 | 2/2018 | Quintero et al. | |
| 2018/0152297 | A1 | 5/2018 | Fielding et al. | |

OTHER PUBLICATIONS

W. Timothy Polk et al. ("Cryptographic Algorithms and Key Sizes for Personal Identity Verification," Jun. 2006, pp. 1-17. (Year: 2006).*

David Cooper et al. "Interface for Personal Identity Verification Part 1: PIV Card Application Namespace, Data Model and Representation," May 2015, pp. 1-17. (Year: 2015).*

David Cooper; et al. "Interface for Personal Identity Verification—Part 1: PIV Card Application Namespace, Data Model and Representation," May 2015, pp. 1-17.

W. Timothy Polk; et al. "Cryptographic Algorithms and Key Sizes for Personal Identity Verification," May 2015, pp. 1-19.

Office Action dated for U.S. Appl. No. 15/685,094.

* cited by examiner

```
PUT /your/url HTTP/1.1
Host: www.yourhostname.com
Content-Length: 1234
Content-Type: application/x-apple-aspen-mdm; charset=UTF-8

<?xml version="1.0" encoding="UTF-8"?>
<!DOCTYPE plist PUBLIC "-//Apple//DTD PLIST 1.0//EN" "http://www.apple.com/
DTDs/PropertyList-1.0.dtd">
<plist version="1.0">
  <dict>
    <key>UDID</key>
    <string>...</string>
    <key>CommandUUID</key>
    <string>9F09D114-BCFD-42AD-A974-371AA7D6256E</string>
    <key>Status</key>
    <s̶t̶r̶i̶n̶g̶>̶A̶c̶k̶n̶o̶w̶l̶e̶d̶g̶e̶d̶<̶/̶s̶t̶r̶i̶n̶g̶>̶
    [CERTIFICATE PAYLOAD TO BE INSERTED HERE]        500
  <̶/̶d̶i̶c̶t̶>̶
</plist>
```

DISTRIBUTED PROFILE AND KEY MANAGEMENT

CROSS-REFERENCE TO RELATED APPLICATION

This application relates to U.S. patent application Ser. No. 15/685,094 entitled "DISTRIBUTED PROFILE AND KEY MANAGEMENT," filed on Aug. 24, 2017, the contents of which are incorporated by reference in their entirety herein.

BACKGROUND

Various forms of security cards exist for authentication, such as a personal identity verification (PIV) card, a common access card (CAC), a public-key infrastructure (PKI) card, or similar card. Users are typically required to physically insert a card into a card reader on a desktop computer and provide a personal identification number (PIN). This form of authentication is commonly used by government and military personnel to access applications, websites, and other data. However, many mobile devices do not include or have access to a card reader. Accordingly, the National Institute of Standards and Technology (NIST) proposed various standards for "derived credentials," which are cryptographic credentials derived from credentials set forth in a PIV card or a CAC card.

With the emergence of bring-your-own-device (BYOD) technology in the workplace, an enterprise can permit its employees to use their own devices to access enterprise data, such as email and corporate documents. However, prior to an employee using his or her own device in the workplace, the enterprise can require the employee to enroll with a management service capable of protecting enterprise data stored on a device from theft, data loss, and unauthorized access. Through an administrator console, administrators for the enterprise can oversee the operation of enrolled devices. For example, depending on the capabilities of an operating system, an administrator of an enterprise can remotely install applications, resources, or other data on an employee's device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is an example of a partially populated device profile in extensible markup language schema.

DETAILED DESCRIPTION

Figure 1:
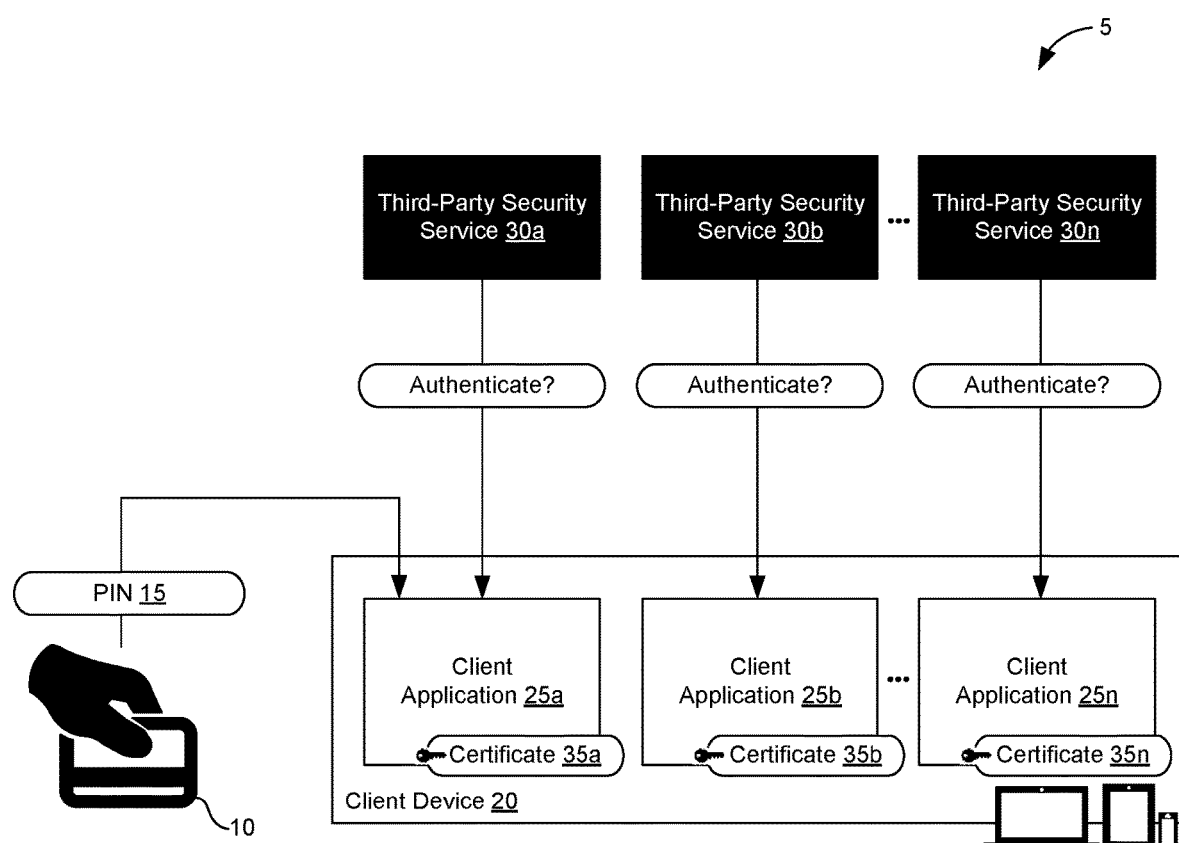
FIG. 1 is a drawing that illustrates the traditional process of using derived credentials to authenticate a client device, where a derived credential is inaccessible to other client applications.

The present disclosure relates to distributed profile and key management for network security and enrolled device management. As noted above, various types of physical security cards are used by security vendors to authenticate users and provide access to various applications, websites, and data. With the advent of mobile technology, and because many mobile devices do not typically include a card reader, the NIST has proposed various standards for "derived credentials," or credentials that are derived from those set forth in a PIV or CAC card. To access applications, websites, and other data using a mobile device, a user is commonly required to download an application or access an online portal offered by a security vendor and provide information pertaining to his or her security card, such as a PIN. The mobile device will generate a private key and a web service maintained by a security vendor can authenticate the mobile device and provide the mobile device with a public certificate, ultimately creating a private/public key pair on the device.

With respect to network security, device-side cryptographic key generation is generally preferred over server-side cryptographic key generation because server-side key generation requires the server to maintain a list of keys for a multitude of devices in a central location. If a hacker were to infiltrate a server, the list of keys generated and stored for tens to thousands of managed devices would be compromised. In context of device management, device-side cryptographic key generation is not performed because security certificates are required by various operating systems to be included in a device profile, which are managed by the server.

For instance, some operating systems of managed devices, such as Apple® iOS, handle key management in conjunction with profile management. For instance, assume an administrator desires to configure wireless fidelity (Wi-Fi) settings, virtual private network (VPN) settings, and email server settings on a managed device having the iOS operating system. The management service would be required to create a first profile for the Wi-Fi settings, a second profile for the VPN settings, and a third profile for the email server settings. Moreover, the management service is required to generate a different certificate for each of the profiles and push each of the certificates to the managed device, consuming storage resources and network bandwidth. Current limitations to iOS prevent a credential from being generated locally on a client device and used in multiple profiles.

The aforementioned limitations are addressed herein by providing systems for distributed key and profile management that provide device-side key generation and use a single certificate in multiple device profiles. As can be appreciated, the systems for distributed key and profile management increase network security of managed devices as cryptographic keys for each device are not centrally located and are instead distributed among each respective device. Moreover, server computational efficiency and network bandwidth performance is improved as a server is not required to periodically generate and distribute cryptographic keys in device profiles, as will become apparent.

In one example, a management service can generate a partially populated device profile and provide the partially populated device profile to a client application, referred to as a PIV-derived or PIV-D application, executable on a client device. The client application can generate a derived credential and insert the derived credential into the partially populated device profile to generate a fully populated device profile. The derived credential can be shared with at least one other client application on the client device. By delegating completion of a profile to the client device, the management service can configure a client device with multiple device profiles that rely on a single certificate.

With reference to FIG. 1, a process map 5 is shown illustrating a traditional process for using derived credentials to authenticate a user in a mobile device setting. For instance, a user can be assigned a physical security card 10, such as a PIV or CAC card, that is traditionally authenticated using a card reader. However, some security vendors offer the ability for a user to provide information, such as a PIN 15, using a client device 20 to receive a derived credential. The derived credential can be used to access secure data. Generally, a user must authenticate and present their card every instance in which they require a new derived credential. To do so, the user can access one of a plurality of client applications 25a . . . 25n executable on the client device 20.

Currently, client applications 25 are specific to a single security vendor, and are thus tied to one of a plurality of third-party security services 30a . . . 30n. For instance, a client application 25 offered by AlphaCo will interact only with a third-party security service 30 offered by AlphaCo, which can include a web service or a network-based application programming interface (API). Moreover, any derived credentials, including certificates 35a . . . 35n, generated based on an authentication by the third-party security services 30 cannot be shared with other client applications 25 on the client device 20. For instance, the client application 25a offered by AlphaCo can generate a derived credential certificate 35a; however, the certificate 35a cannot be shared with the other client applications 25b . . . 25n.

Figure 2:
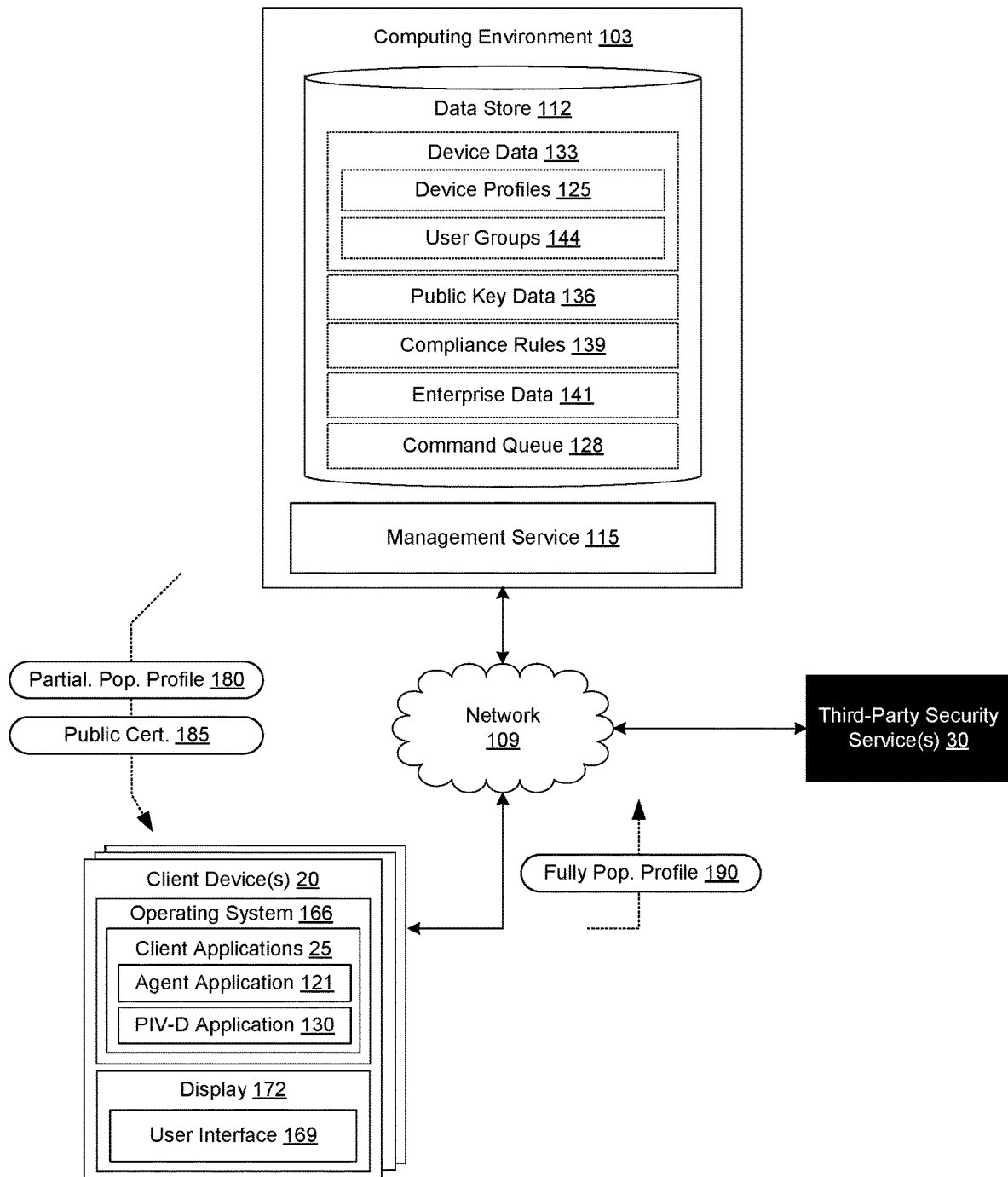
FIG. 2 is a drawing of a networked environment for distributed profile and key management.

Turning now to FIG. 2, shown is an example of a networked environment 100. The networked environment 100 can include a computing environment 103, one or more client devices 20, and one or more third-party security services 30 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 20 remotely over the network 109, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115 as well as other applications, services, processes, systems, engines, or functionality not discussed in detail herein. The management service 115 can be executed to oversee the operation of client devices 20 enrolled with the management service 115. In some examples, an enterprise, such as a company, organization, or other entity, can operate the management service 115 to oversee or manage the operation of the client devices 20 of its employees, contractors, customers, or other users having accounts with the enterprise.

The management service 115 can cause various software components to be installed on a client device 20. Such software components can include, for example, client applications 25, resources, libraries, drivers, device configurations, or other similar components that require installation on the client device 20 as specified by an administrator of the management service 115. The management service 115 can further cause policies to be implemented on a client device 20. Policies can include, for example, restrictions or permissions pertaining to capabilities of a client device 20 such that access to enterprise data is secured on the client device 20.

The management service 115 can interact with one or more client applications 25 executed on the client devices 20. In one example, the management service 115 interacts with an agent application 121 on the client device 20 to enroll the client device 20 with the management service 115. The agent application 121 can be registered as a device administrator of the client device 20, which can provide the agent application 121 with sufficient privileges to control the operation of the client device 20. The agent application 121 can be configured to configure a client device 20 in accordance with a data structure provided to the client device 20 as a document, referred to as a device profile 125.

In one example, the agent application 121 can be registered as the device administrator through the installation of a device profile 125 at the operating system of the client device 20 that causes the operating system to designate the agent application 121 as the device administrator. The management service 115 can direct the agent application 121 to perform device management functions on the client device 20. For example, the management service 115 can direct the agent application 121 to control access to certain software or hardware functions available on the client device 20. As a result, the management service 115 can verify that configuration and operation of the client device 20 is in conformance with predefined criteria that ensures that enterprise data, or other data, is protected from data loss, unauthorized access, or other harmful event. The management service 115 can further provision enterprise data to the client device 20 through the agent application 121.

In one example, the management service 115 can cause the agent application 121 to control use of the client device 20 or provision enterprise data to the client device 20 through use of a command queue 128 provided by the management service 115. The management service 115 can store commands in a command queue 128 associated with a particular client device 20 and can configure the agent application 121 executed by such client device 20 to retrieve the contents of the command queue 128. In one example, the agent application 121 can be configured to retrieve the contents of the command queue 128 on a configured interval, such as every four hours, or upon a certain event occurring, such as detection of an unauthorized application executed by the client device 20. In any case, the agent application 121 can retrieve the contents of the command queue 128 by checking in with the management service 115 and requesting the contents of the command queue 128. In one example, the contents of the command queue 128 can include a command that the agent application 121 should cause to be executed on the client device 20. In another example, the contents of the command queue 128 can include a resource or client application 25 that the agent application 121 should cause to be installed on the client device 20, which the client device 20 may access through a URL specified by the command retrieved through the command queue 128.

In one example, the management service 115, upon receiving a request to publish a device profile 125 to one or more client devices 20, can identify one or more data records associated with such device profile 125 and can populate command queues 128 associated with such client devices 20 with commands associated with such data records. For instance, a data record associated with a client application 25 can specify that a particular application should be installed, a particular configuration for the particular application should be applied, and a particular uniform resource locator (URL) from which the particular application can be downloaded. Based on such data record specifications, a command can be generated and placed in a command queue 128 that, when executed by the client device 20, causes the client device 20 to download the particular application from the particular URL, install the application, and change configuration data associated with the particular application to cause the particular application to function in accordance with the particular configuration.

Additionally, the management service 115 can interact with one or more PIV-D applications 130 executed on the client devices 20. The PIV-D application 130 can be executed to generate credentials on a client device 20, such as derived credentials, certificates 35, and cryptographic keys. Additionally, the PIV-D application 130 can act as a keystore or keychain (in place of or in addition to a native operating system keychain) that includes certificates 35, cryptographic keys, and other data required to perform various security-related tasks on the client device 20, as will be discussed.

The data stored in the data store 112 can include, for example, device data 133, public key data 136, compliance rules 139, enterprise data 141, the command queue 128, as well as other data. Generally, device data 133 includes data pertaining to a client device 20 enrolled or managed by the management service 115. Device data 133 can include device profiles 125 as well as user groups 144. Device profiles 125 can include, for example, settings or other data generated by an administrator that deploys specified settings, client applications 25, resources, policies, or other data to a client device 20.

In one example, the management service 115 can generate one or more user interfaces that obtain information about the configuration of client devices 20 enrolled (or to be enrolled) with the management service 115. An administrator can provide information regarding how the administrator desires to configure the client devices 20. In one example, the administrator can specify one or more client applications 25 to be installed on the client device 20. In another example, the administrator can specify settings to be configured on a client device 20, such as Wi-Fi network settings, VPN settings, email server settings, or other settings. Based on the settings specified by the administrator, the management service 115 can generate a device profile 125 that is published for one or more client devices 20. When published, the agent application 121 on a client device 20 can identify the device profile 125 as being applicable to the client device 20 and, as a result, will configure the client device 20 in accordance with the settings set forth in the device profile 125.

The computing environment 103 can include compliance rules 139, which are constraints specified by an administrator for a client device 20 to be in "compliance" with the management service 115. In one example, the agent application 121 can configure hardware or software functionality of a client device 20 such that the client device 20 operates in conformance with the compliance rules 139. Additionally, the agent application 121 can identify when the client device 20 is not in conformance with the compliance rules 139 and can take appropriate remedial actions, such as denying access to enterprise data 141 or other features of the agent application 121.

In some examples, the management service 115 communicates with the agent application 121 or other client application 25 executable on the client device 20 to determine whether vulnerabilities exist on the client device 20 that do not satisfy policies defined by an administrator. Vulnerabilities can include, for example, the presence of a virus or malware on the client device 20, the client device 20 being "rooted" or "jailbroken" where root access is provided to a user of the client device 20, the presence of particular applications or files, questionable device configurations, vulnerable versions of client applications 25, or other vulnerability as can be appreciated.

The client device 20 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 20 can also be equipped with networking capability or networking interfaces, including a localized networking or communication capability, such as a near-field communication (NFC) capability, radio-frequency identification (RFID) read or write capability, or other localized communication capability.

The client device 20 can include an operating system 166 configured to execute various client applications 25, such as the agent application 121, the PIV-D application 130, as well as other applications. Some client applications 25 can access enterprise data 141 and other network content served up by the computing environment 103 or other servers, thereby rendering a user interface 169 on a display 172, such as a liquid crystal display (LCD), touch-screen display, or other type of display device. To this end, some client applications 25 can include a browser or a dedicated application, and a user interface can include a network page, an application screen, or other interface. Further, other client applications 25 can include device management applications, enterprise applications, social networking applications, word processors, spreadsheet applications, media viewing application, or other applications.

Next, a general description of the operation of the various components of the networked environment 100 is provided. A user can have a client device 20 enrolled with the management service 115 or a client device 20 may desire to enroll with the management service 115. Traditionally, the user might execute an agent application 121, provide credentials, such as an email address and a password, and the management service 115 would proceed to enroll the client device 20 with the management service 115. In additional examples, enrollment is not required with a management service is not required; however, the administrator can provide specifications to oversee or configure a client device. Ultimately, the management service 115 can send one or more device profiles 125 to the client device 20 that causes the client device 20 to be configured as specified by an administrator of the management service 115.

Depending on the nature of the content accessed, the user can be required to authenticate the client device 20 using a derived credential, or a credential derived from a physical security card. In some examples, an administrator for the management service 115 can enable the use of derived credentials by specifying derived credentials as a suitable certificate source in an administrator console. To this end, the user can first execute the PIV-D application 130, as opposed to the agent application 121, to authenticate the client device 20. However, as client applications 25 on some operating systems 166 are sandboxed, any derived credentials cannot be shared with other applications. Additionally, any device profiles 125 generated by the management service 115 require its own security certificate 35.

Accordingly, the PIV-D application 130 can generate or request a derived credential from a third-party security service 30. For instance, the PIV-D application 130, using a network call or API call specific to a particular security vendor, can request a derived credential from one of the third-party security services 30. The request can include, for example, information associated with a physical security card as well as other authentication data, such as a PIN or password. If the third-party security service 30 authenticates the user of the client device 20, the PIV-D application 130 can generate a derived credential which can be used to access particular network content, such as enterprise data 141 or other data. As features of native keychain and keystore services offered by operating systems 166 are limited, the PIV-D application 130 can act as its own keychain and can maintain derived credentials necessary to sign, decrypt, or authenticate requests on behalf of other client applications 25.

To reduce the number of certificates 35 created by the management service 115, the management service 115 can use the derived credentials as opposed to creating a new certificate 35. However, transmission of the derived credentials over the network 109 creates security vulnerabilities as the network traffic can be detected by sniffing software. Additionally, maintaining a listing of derived credentials on the computing environment 103 subjects all enrolled devices to a central attack. Thus, the derived credentials can be kept on the client device 20. However, to utilize the derived credentials when configuring the client device 20, the management service 115 can generate an incomplete device profile 125, referred to as a partially populated device profile 180. The partially populated device profile 180 can include a device profile 125, such as an XML, data structure or document, that includes information necessary to configure at least one setting of the client device 20; however, the credential payload portion of the device profile 125 is left empty or a temporary string is used for eventual replacement.

The management service 115 can generate a public certificate 185 that is unique to a client device 20. A public key set forth in the public certificate 185 can be used to encrypt data that can only be read by the client device 20, as will be discussed. For instance, the public key can be used to encrypt device profiles 135 that can only be decrypted and installed by a client device 20 using a private key. The management service 115 can send the public certificate 185 to the client device 20 along with the partially populated device profile 180.

The PIV-D application 130 can insert derived credentials into the partially populated device profile 180 to create a fully populated device profile 190 locally on the client device 20. For instance, the non-populated portion of the XML or JSON data structure can be modified by the PIV-D application 130 to include a credential payload. The credential payload can include XML or JSON schema using variable names and variable values necessary to configure the use of a credential on a client device 20, as can be appreciated. The PIV-D application 130 can encrypt the fully populated device profile 190 using a private cryptographic key corresponding to the public certificate 185. The PIV-D application 130 can send the fully populated device profile 190, as encrypted, to the management service 115 over the network 109.

The management service 115 can store the fully populated device profile 190 in the data store 112. As the management service 115 now has a fully populated device profile 190, the management service 115 can configure the client device 20. For instance, the management service 115 can configure Wi-Fi, VPN, email server, or other settings of the client device 20 by sending the fully populated device profile 190 to the agent application 121 of the client device 20. The agent application 121 can decrypt the fully populated device profile 190 (as the client device 20 has the private cryptographic key stored thereon) and direct the operating system 166 to install the fully populated device profile 190 on the client device 20.

Figure 3:
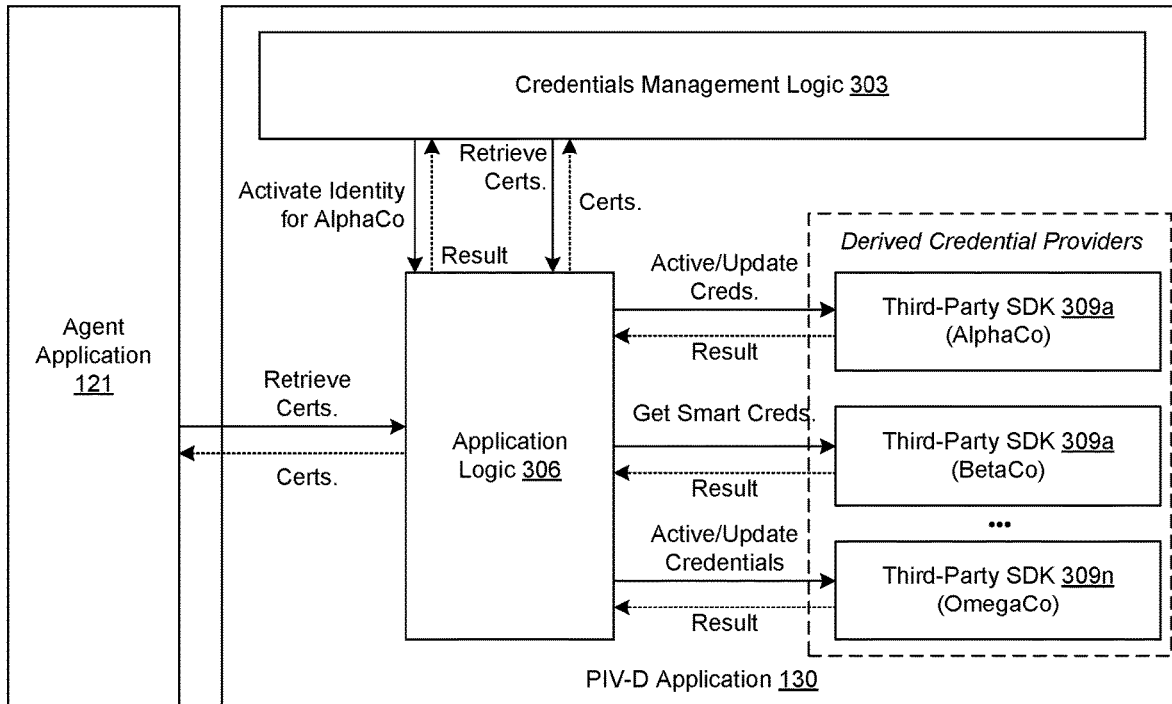
FIG. 3 is a schematic diagram of an application executed on the client device to authenticate a device and maintain a keychain of credentials.

Turning now to FIG. 3, a schematic diagram of the PIV-D application 130 is shown according to various examples. The PIV-D application 130 can include, for example, credential management logic 303, application logic 306, as well as other logic. Additionally, the PIV-D application 130 can also include one or more third-party software development kits (SDKs) 309a . . . 309n, which can include libraries or functions provided by a security vendor to authenticate a client device 20 using a physical security card. For instance, the application logic 306 can authenticate the client device 20 by communicating with a third-party security service 30 through a corresponding one of the third-party SDKs 309. If a user desires to authenticate with AlphaCo, the application logic 306 can invoke a necessary API call provided in the third-party SDK 309a corresponding to AlphaCo to authenticate with a third-party security service 30 maintained by AlphaCo. In response to a successful authentication, the application logic 306 can generate necessary credentials, such as a derived credential certificate 35 or other public/private key pair.

To implement distributed key management, the credentials management logic 303 can generate and maintain a keychain or keystore that includes security information required on an enrolled device. In some examples, the client certificates 35 can include authentication certificates 35, email certificates 35, signature certificates 35, or encryption keys. Improvements in network security are provided by implementing the distributed key management as a decentralized keychain, making it much more difficult to gain access to enterprise client certificates 35 centrally as a hacker would have be required to target an application on each enrolled device, as opposed to attacking a central server that stores all of the credentials centrally. In various examples, the PIV-D application 130 can handle client certificate renewals for simple certificate enrollment protocol (SCEP), a feature that is currently unsupported in Apple® iOS. Additionally, the credentials management logic 303 can share credentials with other client applications 25, such as the agent application 121.

In additional examples, the application logic 306 can handle the generation of device profiles 125 with credentials that were generated in the PIV-D application 130 using distributed key management. For instance, derived credentials generated based on an authentication performed using one of the third-party SDKs 309 can be used to generate device profiles 125 that include the derived credentials. Accordingly, the PIV-D application 130 can be described as securely generating a single set of client certificates 35 on a client device 20, where these credentials continue to be utilized securely as part of the device profiles 125. For instance, each time a new device profile 125 is published by the management service 115, the PIV-D application 130 can be utilized to insert a credential in the credential payload. Thus, multiple device profiles 125 can be generated that include a single certificate 35 or other credential. To this end, the management service 115 is optimized as the number of certificates 35 generated is greatly reduced, which in turns saves bandwidth, network storage, and operational costs.

Figure 4:
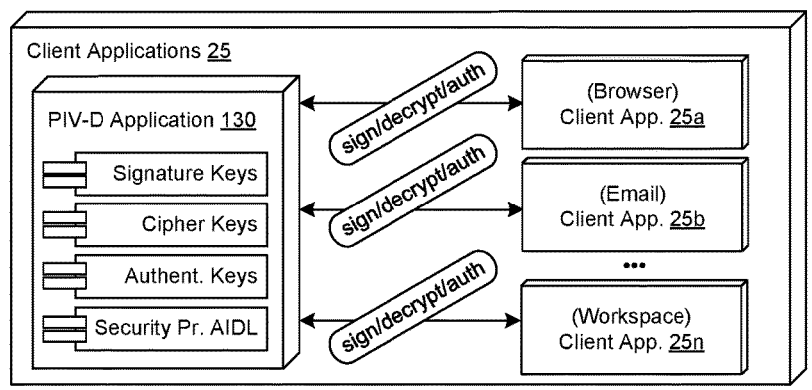
FIG. 4 is a schematic diagram of applications executed on the client device, where one of the applications can perform signatures, decryptions, and authentications on behalf of other client applications.

With reference to FIG. 4, a schematic diagram of various client applications 25a . . . 25n executed in a client device 20 is shown according to various examples. As the PIV-D application 130 maintains a keychain or keystore that includes security information required on an enrolled device, the PIV-D application 130 can share credentials with other client applications 25, such as a browser client application 25a, an email client application 25b, a workspace client application 25n, or other type of client application 25. In some examples, the PIV-D application 130 can use the credentials maintained in the keychain to sign, decrypt, or authenticate requests for client applications 25 having a same SDK or client applications 25 residing in a single container. For instance, the PIV-D application 130 can maintain a keychain of authentication certificates 35, email certificates 35, signature certificates 35, or encryption keys. In the event a client application 25 requires data to be decrypted, the client application 25 can make a programmatic call to the PIV-D application 130, which can decrypt the data and provide a result to the client application 25.

Referring next to FIG. 5, an example of a partially populated device profile 180 is shown according to various examples. As a device profile 125 can include an XML data structure or a javascript object notation (JSON) data structure, the partially populated device profile 180 can include XML or JSON schema. Each key-value pair in the data structure can be generated to include a necessary value as specified by an administrator to configure a managed device. However, a credential payload portion 500 of the data structure can be left blank or can include a string of characters, such as "CERTIFICATE PAYLOAD TO BE INSERTED HERE," that can be replaced by the PIV-D application 130 at a later time. For instance, the PIV-D application 130 can perform a find and replace operation using a known string value used by the management service 115. As can be appreciated, suitable credentials can be inserted into the credential payload portion 500 in conformance with necessary XML and JSON data structure requirements. Additionally, the PIV-D application 130 can use key-value pairs in the credential payload portion 500 suitable for interpretation by the agent application 121 or native mobile device management features of an operating system 166, such as Apple® iOS or Android®.

Figure 6:
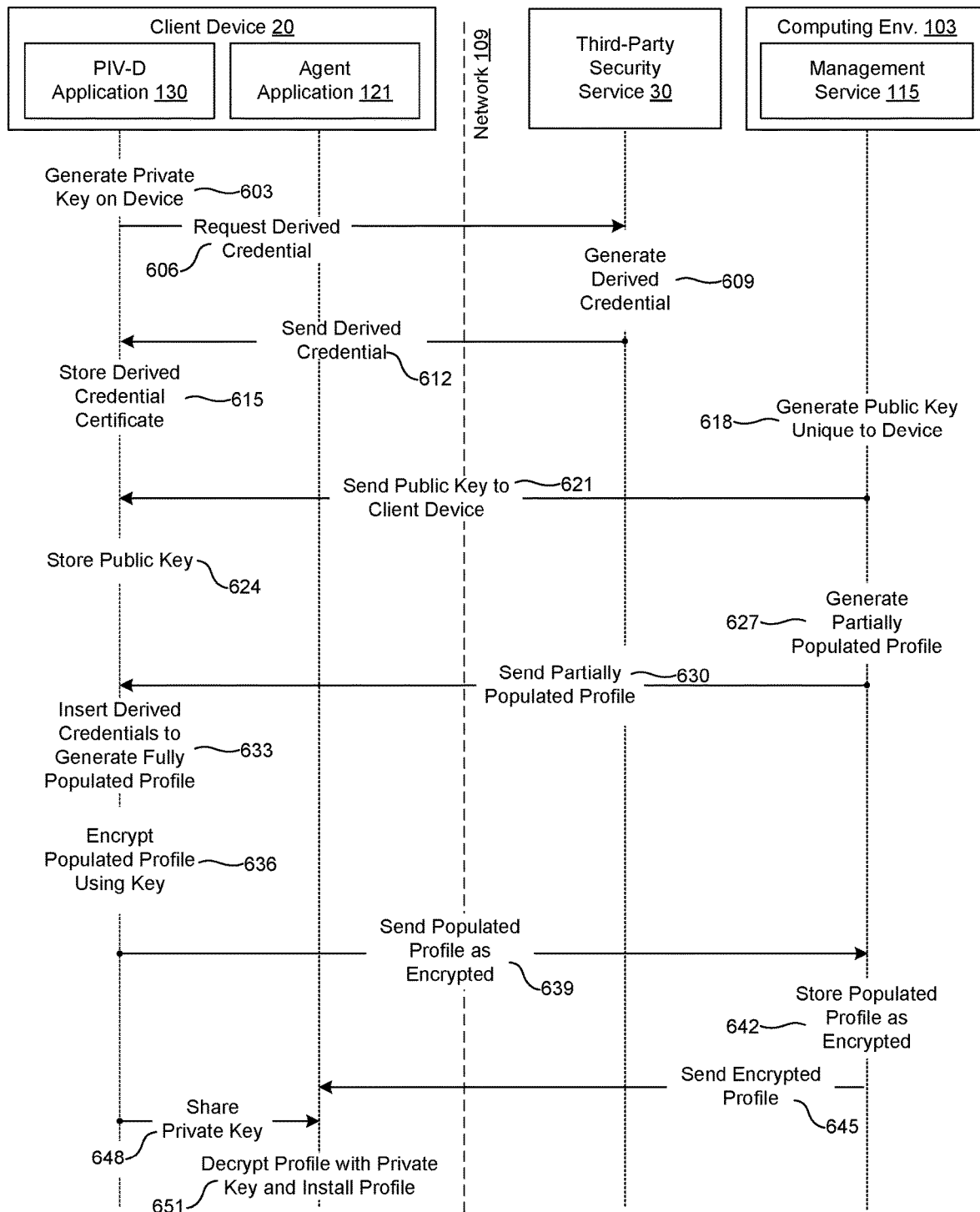
FIG. 6 is a sequence diagram illustrating functionality implemented by components of the networked environment.

Turning now to FIG. 6, a sequence diagram 600 is shown illustrating example operations of the networked environment 100. It is understood that a user may desire to enroll a client device 20 with the management service 115 and may desire to use a PIV or CAC card to access particular network content. The flow diagram addresses constraints imposed by some operating systems 166, such as Apple® iOS, that bind security certificates 35 to device profiles 125.

Beginning with step 603, the PIV-D application 130 can generate a private key on the client device 106. In some examples, the PIV-D application 130 can generate the private key based at least in part on a type of physical security card used for authentication as well as a particular security vendor.

Next, in step 606, the PIV-D application 130 can request a derived credential from the third-party security service 30. For instance, the PIV-D application 130, using a network call or API call specific to a particular security vendor, can request a derived credential from one of the third-party security services 30. The request can include, for example, data stored on a physical security card, such as a PIV or CAC card.

In step 609, in response to the request, the third-party security service 30 can generate a derived credential using, for example, information pertaining to an owner of the physical security card. The third-party security service 30 can determine whether to generate the derived credential based at least in part on an authentication of the client device 20 as well as information pertaining to an owner of the physical security card.

In step 612, the third-party security service 30 can send the derived credential certificate 35 to the PIV-D application 130. In some examples, the third-party security service 30 will merely authenticate the client device 20 and instruct the PIV-D application 130 to generate the derived credential locally on the client device 20.

In step 615, the PIV-D application 130 can store the derived credential certificate 35, ultimately having a public/private key pair based on the private key generated on the device in step 603. The PIV-D application 130 can thus maintain a keychain of credentials that can be used repeatedly for new device profiles 130.

In step 618, the management service 115 can generate a public key that is unique to the client device 20. The public key can be used to encrypt data that can only be read by the client device 20, as will be discussed. For instance, the public key can be used to encrypt device profiles 135 that can only be decrypted and installed by a client device 20 using a private key.

Next, in step 621, the management service 115 can send the public key to the client device 20. In some examples, the management service 115 can send the public key to the client device 20 in response to a successful enrollment of the client device 20.

In step 624, the PIV-D application 130 can store the public key in memory of the client device 20. As noted above, the PIV-D application 130 can act as a keychain or keystore and maintain cryptographic keys, certificate 35, and other security data. Thus, in some examples, the PIV-D application 130 can store the public key in a keychain maintained by the PIV-D application 130. In further examples, the PIV-D application 130 can also utilize a native keychain offered by an operating system 166, such as Apple® iOS.

In step 627, the management service 115 can generate a partially populated device profile 180. In some examples, the partially populated device profile 180 can include an XML or JSON data structure that does not include a certificate payload. In other words, the partially populated device profile 180 can include settings that can be used to configure or manage a client device 20; however, any information pertaining to security certificates 35 is not included in the partially populated device profile 180.

In step 630, the management service 115 can send the partially populated device profile 180 to the PIV-D application 130 over the network 109.

In step 633, the PIV-D application 130 can insert credentials, such as a derived credential certificate 35, a corresponding private key, or other required data into the partially populated device profile 180 to generate a fully populated device profile 190. For instance, the non-populated portion of the XML or JSON data structure can be modified by the PIV-D application 130 to include a credential payload. The credential payload can include XML or JSON schema using variable names and variable values, as can be appreciated.

Thereafter, in step 636, the PIV-D application 130 can encrypt the fully populated device profile 190 using a private key corresponding to the public key generated in step 618. The fully populated device profile 190 can be encrypted to prevent the credential information, now included in the device profile 125, from being accessed or unintentionally disseminated.

In step 639, the PIV-D application 130 can send the fully populated device profile 190, as encrypted, to the management service 115 over the network 109.

In step 642, the management service 115 can store the fully populated device profile 190 in the data store 112. As the management service 115 now has a fully populated device profile 190, the management service 115 can configure the client device 20. For instance, the management service 115 can configure the client device 20 by sending the fully populated device 190 profile to the agent application 121.

In step 645, the management service 115 can send the fully populated device profile 190 to the agent application 121 of the client device 20. Upon receipt, the agent application 121 is configured to use the fully populated device profile 190 to configure the client device 20.

In step 648, the PIV-D application 130 can share the private key or other derived credential with another client application 25, such as the agent application 121. In some examples, the PIV-D application 130 can share the private key with other client applications 25 in the same container. In other examples, the PIV-D application 130 can share the private key with client applications 25 that include a common SDK with the PIV-D application 130.

In step 651, the agent application 121 can use the private key to decrypt the fully populated device profile 190. The agent application 121 can install the fully populated device profile 190 on the client device 20. In some examples, the agent application 121 communicates with native mobile device management features of an operating system 166, such as Apple® iOS, to install the fully populated device profile 190. Thereafter, the process can proceed to completion.

Figure 7:
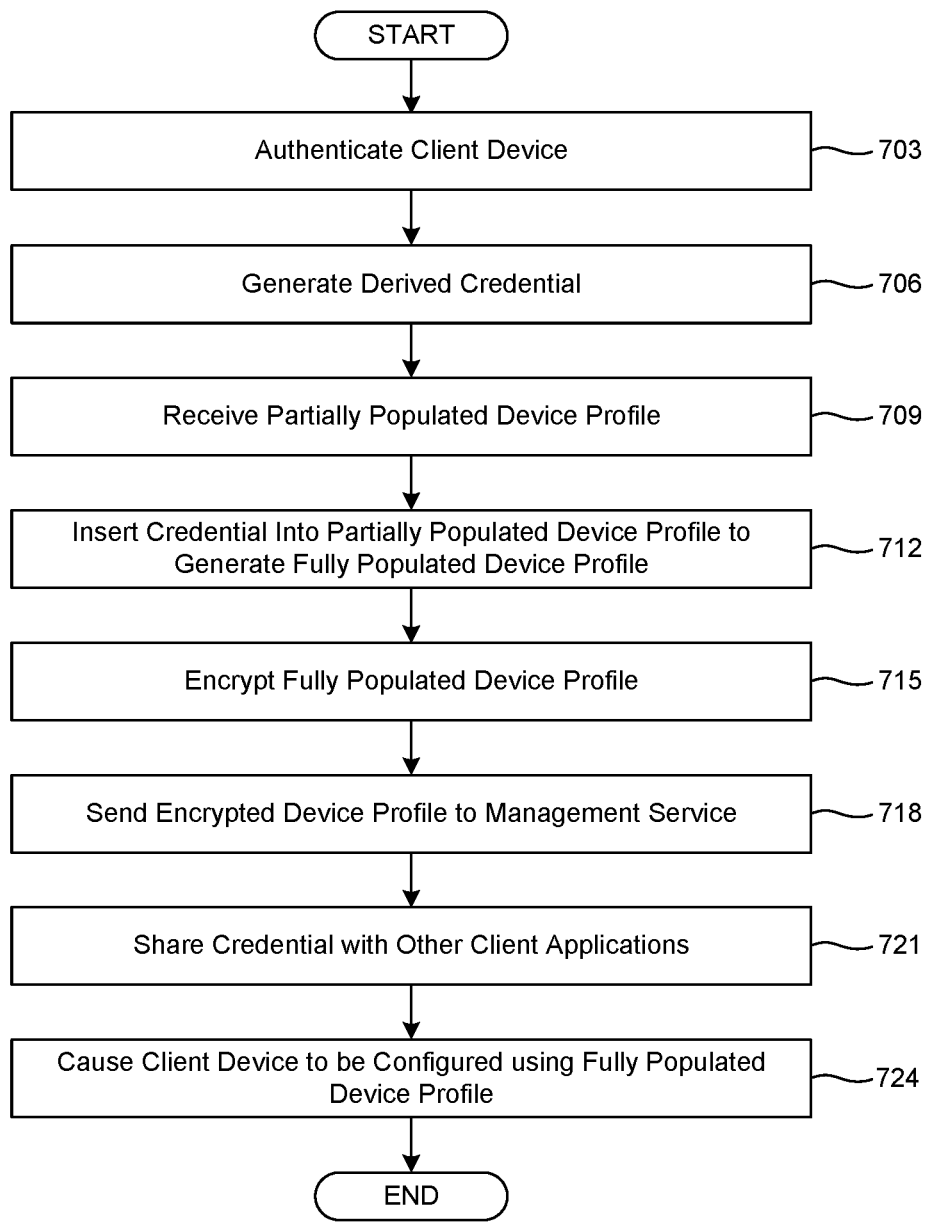
FIG. 7 is a flowchart illustrating functionality implemented by components of the networked environment.

Moving on to FIG. 7, shown is a flowchart that provides one example of the operation of a portion of the client device 20. The flowchart of FIG. 7 can be viewed as depicting an example of elements of a method implemented by the PIV-D application 130 executing in the client device 20 according to one or more examples. The separation or segmentation of functionality as discussed herein is presented for illustrative purposes only.

Beginning with step 703, the PIV-D application 130 can authenticate the client device 20, for example, by communicating with a third-party security service 30 using a third-party SDK 309. In some examples, the PIV-D application 130 can generate a private key based at least in part on a type of physical security card used for authentication as well as a particular security vendor. The PIV-D application 130 can then request a third-party security service 30 to authenticate a user of the client device 20. For instance, the PIV-D application 130, using a network call or API call specific to a particular security vendor, can request the third-party security services 30 to provide authentication credentials to the client device 20. The request can include, for example, data stored on a physical security card, such as a PIV or CAC card, a PIN, a password, or other information.

In step 706, the PIV-D application 130 can generate a derived credential using, for example, information pertaining to an owner of the physical security card. In some examples, the derived credential can include, for example, an X.509 security certificate 35. The PIV-D application 130 can store the derived credential certificate 35, ultimately having a public/private key pair based on a private key generated on the client device 20.

In step 709, the PIV-D application 130 can receive a partially populated device profile 180 from the management service 115. In some examples, the partially populated device profile 180 can include an XML or JSON data structure that does not include a certificate payload. For instance, the partially populated device profile 180 can include settings that can be used to configure or manage a client device 20; however, any information pertaining to a credential, such as a security certificate 35, is not included in the partially populated device profile 180.

In step 712, the PIV-D application 130 can insert credentials, such as a derived credential certificate 35, a corresponding private key, or other required data into the partially populated device profile 180 to generate a fully populated device profile 190. For instance, the PIV-D application 130 can modify the non-populated portion of the XML or JSON data structure to include a credential payload. The credential payload can include XML or JSON schema using variable names and variable values.

Next, in step 715, the PIV-D application 130 can encrypt the fully populated device profile 190 using a private key. In some examples, the private key is generated locally on the client device 20 and the management service 115, or other service executable in the computing environment 103, does not have access to the private key.

In step 718, the PIV-D application 130 can send the fully populated device profile 190, as encrypted, to the management service 115 over the network 109. Thus, in the event of a breach, any credentials used on a client device 20 cannot be accessed as they are encrypted before being sent to the management service 115. The management service 115 can store the fully populated device profile 190 in the data store 112.

In step 721, the PIV-D application 130 can share the derived credential with another client application 25, such as the agent application 121. In some examples, the PIV-D application 130 can share the derived credential with other client applications 25 in the same container. In other examples, the PIV-D application 130 can share the derived credential with client applications 25 that include a common SDK with the PIV-D application 130.

In step 724, the PIV-D application 130 can cause the client device 20 to be configured using the fully populated device profile 190. In some examples, the PIV-D application 130 can receive the fully populated device profile 190 from the management service 115, indicating that the fully populated device profile 190 should be installed on the client device 20. The PIV-D application 130 can decrypt the fully populated device profile 190 and either provide the fully populated device profile 190 to the agent application 121 to configure the client device 20 or invoke native mobile device management features of the operating system 166 to configure the client device 20. Thereafter, the process can proceed to completion.

Figure 8:
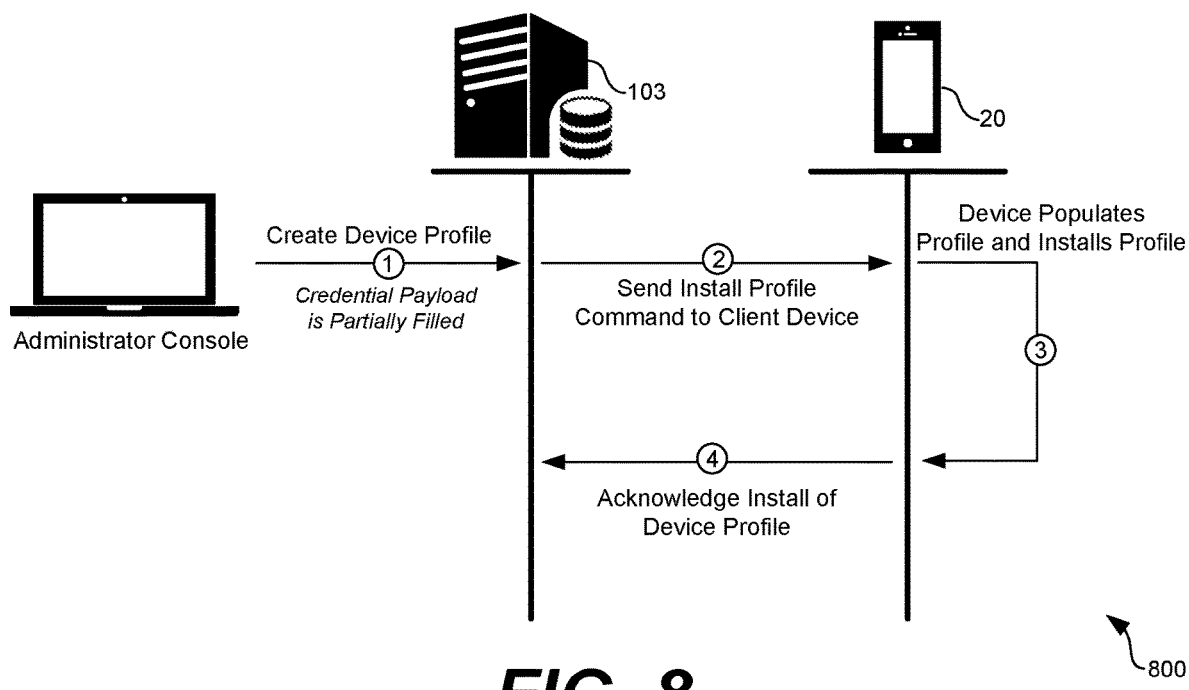
FIG. 8 is a flow diagram illustrating functionality implemented by components of the networked environment.

Turning now to FIG. 8, a flow diagram 800 is shown illustrating functionality implemented by components of the networked environment 100. An administrator can create a device profile 125 for client devices 20 having the Android® operating system 166 installed thereon. In some examples, the administrator for the management service 115 can enable the use of derived credentials by specifying derived credentials as a suitable certificate source in an administrator console. In response, instead of creating a device profile 125, or a fully populated device profile 190, the computing environment 103 can create a partially populated device profile 180 having the credential payload empty or partially filled. In some examples, the credential payload contains only information about the usages that are specified by the administrator in the administrator console, such as Wi-Fi, VPN, email, or other usage.

Once the device profile 125 is created and published, or once the computing environment 103 sends an install profile command to the client device 20, the client device 20 can access the partially populated device profile 180. The client device 20 can populate the partially populated device profile 180 with derived credentials and install the fully populated device profile 190 on the client device 20. Finally, the client device 20 can send an acknowledgement indicating that the device profile 125 has been installed.

Figure 9:
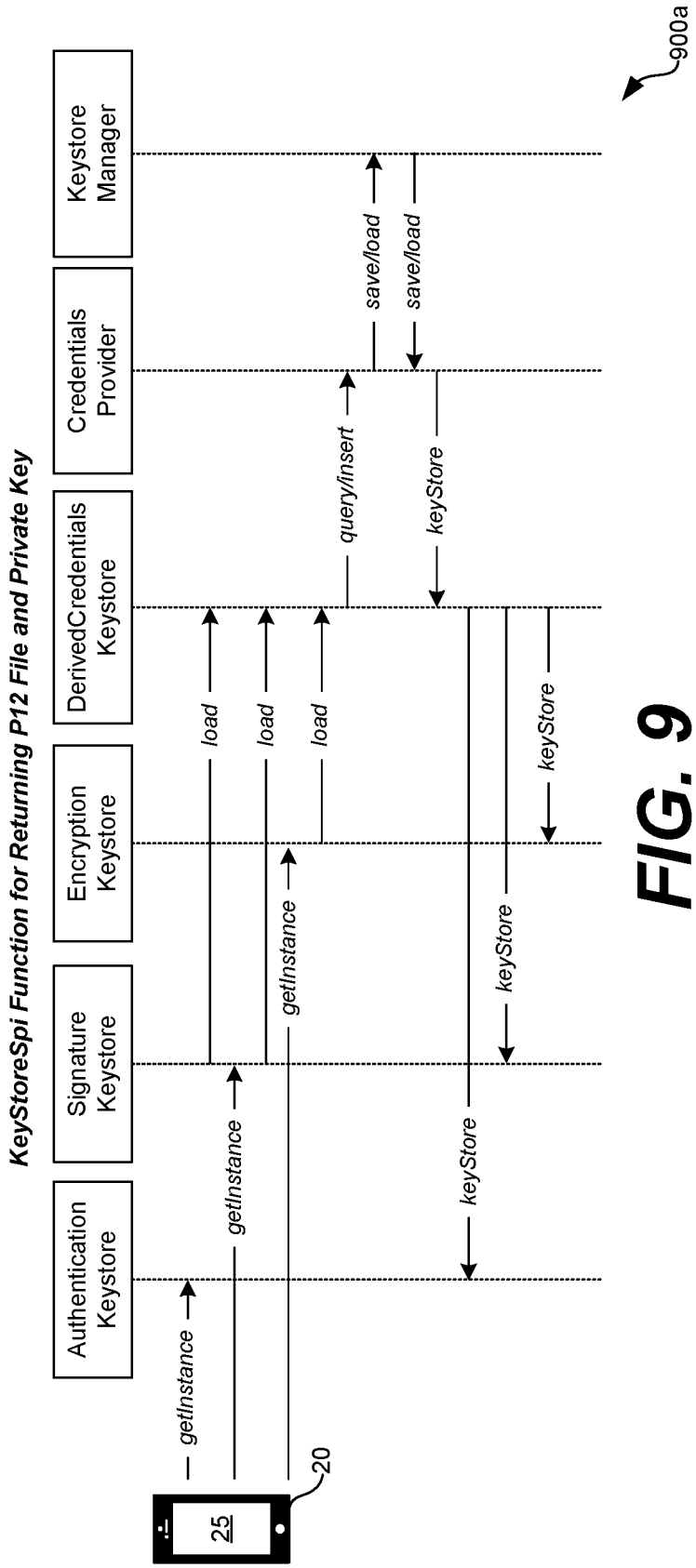
FIGS. 9-11 are diagrams illustrating programmatic calls made for various functions that can be used in third-party applications to invoke features of a PIV-D application.
Figure 10:
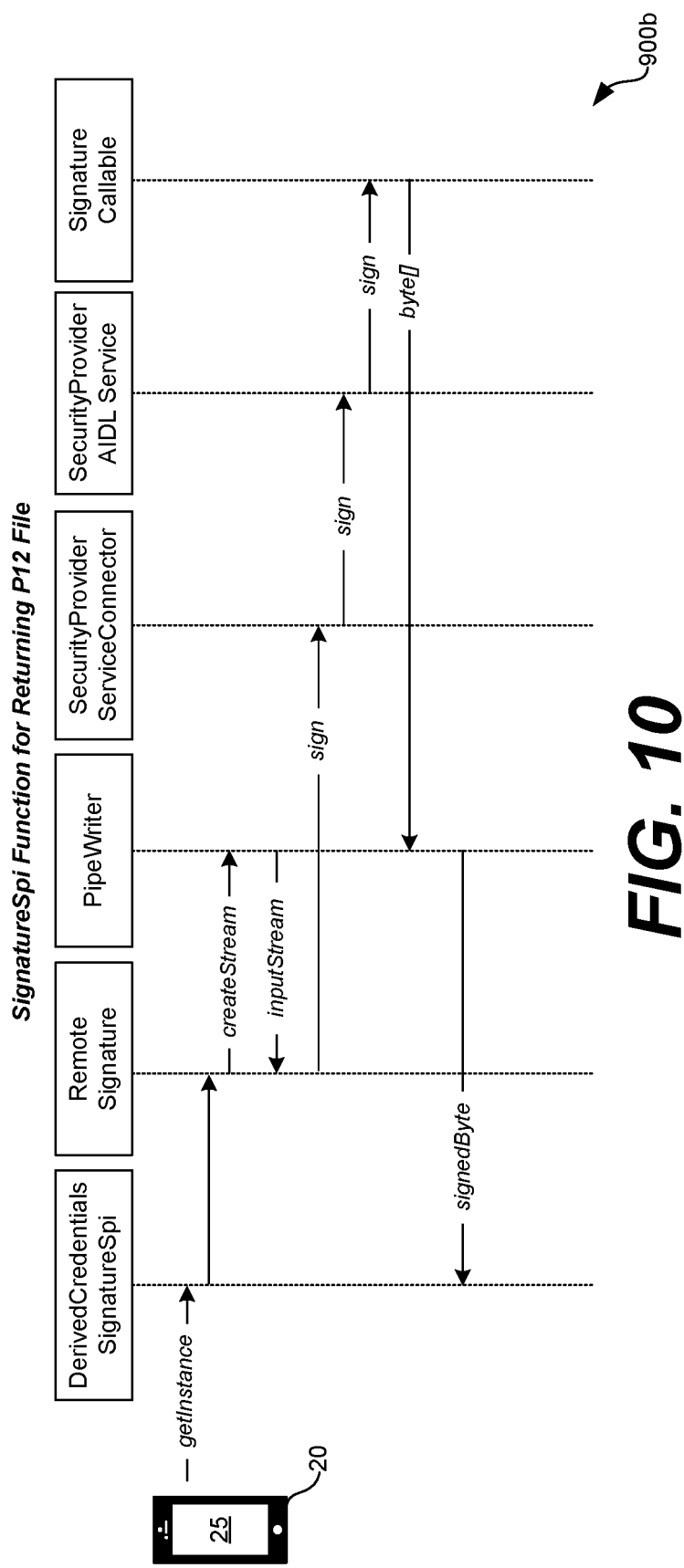
Figure 11:
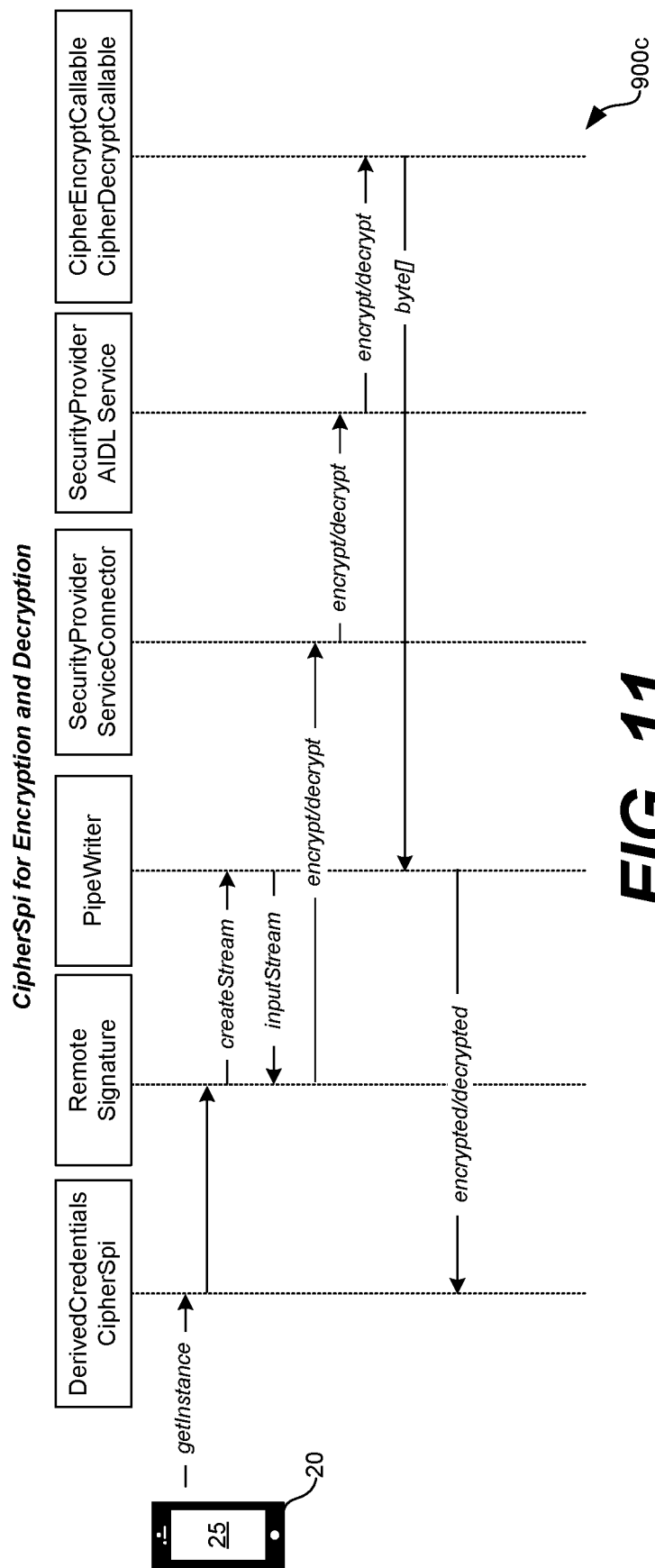

Referring next to FIGS. 9-11, diagrams 900a . . . 900c are shown that illustrate programmatic calls that can be made by various client applications 25 to invoke features of the PIV-D application 130. For instance, a library or an SDK 309 can be included in a client application 25 that enables the client application 25 to access a keychain maintained by the PIV-D application 130. For instance, if the PIV-D application 130 obtains derived credentials that are used in a device profile 125 to configure Wi-Fi settings on a client device 20, other client applications 25, such as a web browser or an email application, can obtain the derived credential from the keychain maintained by the PIV-D application 130.

Specifically, with respect to FIG. 9, a client application 25 can invoke the "KeyStoreSpi" function to obtain a certificate 35 (as a P12 file) and a private key for authentication tasks, signature tasks, encryption tasks, or other similar tasks. For instance, the client application 25 can invoke Key Store-Spi.getInstance(auth) to obtain access to the authentication keystore, KeyStoreSpi.getInstance(sign) to obtain access to the signature keystore, and KeyStoreSpi.getInstance(encrpt) to obtain access to the encryption keystore. Each keystore, when invoked, can access derived credentials from the derived credentials keystore, which obtain the derived credential from the credentials provider and the keystore manager. With respect to FIG. 10, however, the "SignatureSpi" function can return a certificate 35 (as a P12 file) and an address to a private key, as opposed to the private key itself. With respect to FIG. 11, the "CipherSpi" function can be invoked to perform encryption and decryption on behalf of the client applications 25 to prevent private key leakage.

Figure 12:
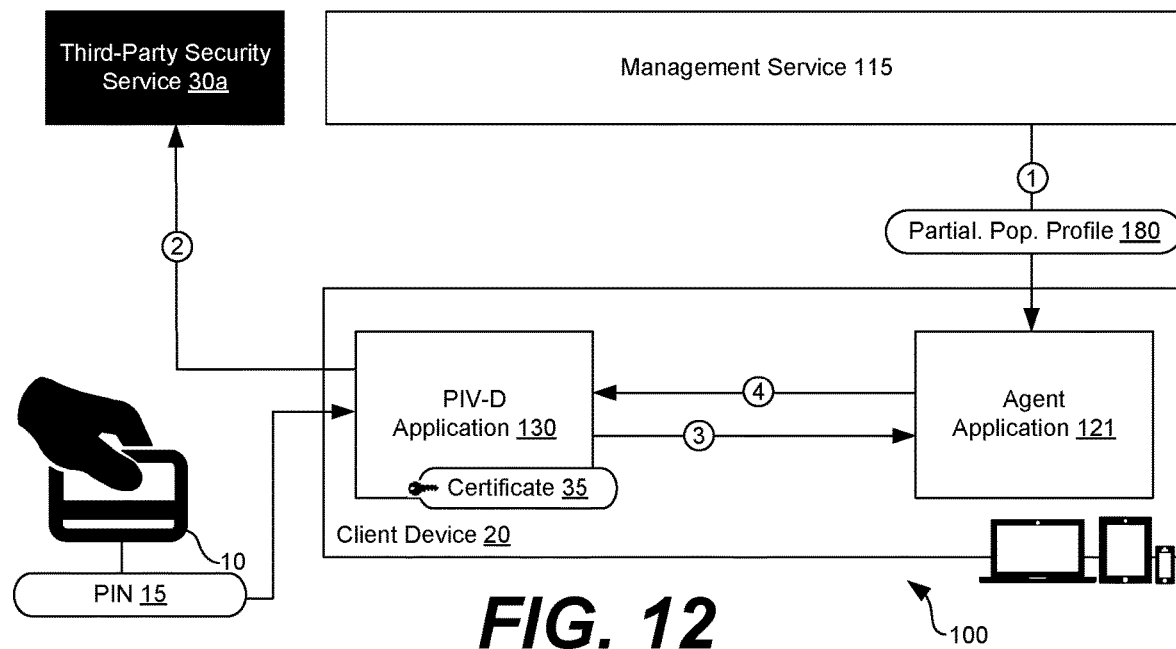
FIG. 12 is a drawing of a networked environment for distributed profile and key management.
Figure 13:
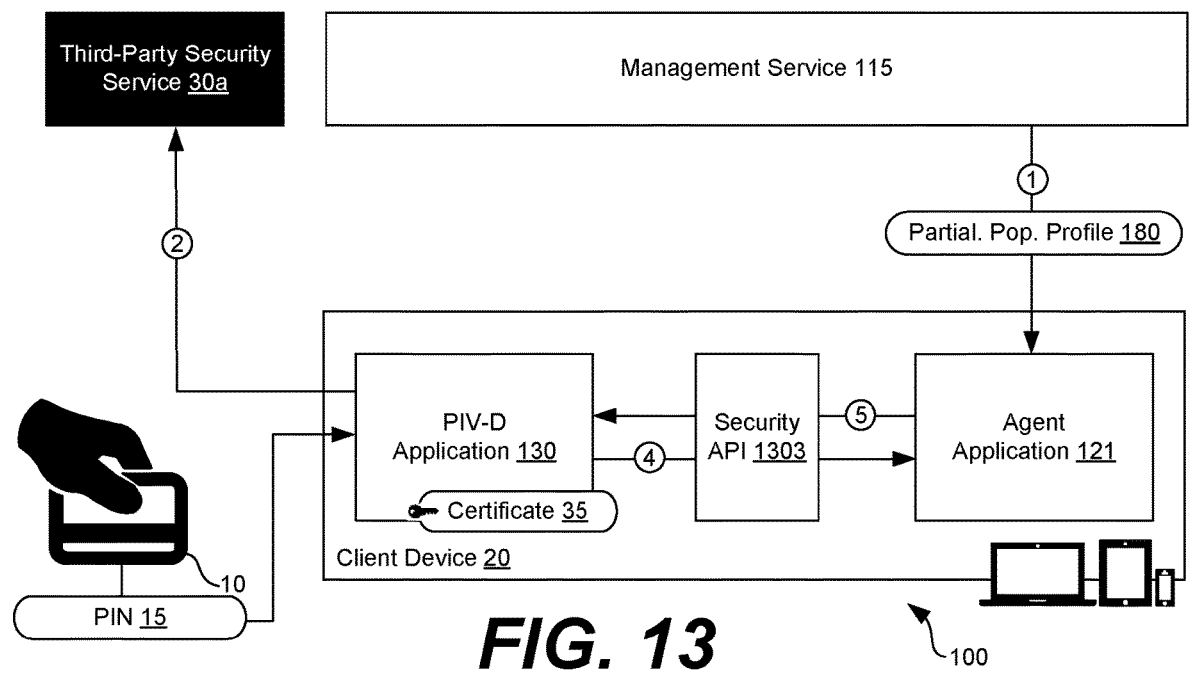
FIG. 13 is another drawing of a networked environment for distributed profile and key management.

Referring next to FIG. 12 and FIG. 13, additional examples of the networked environment 100 for distributed profile and key management are shown. Some operating systems 166, such as Android®, do not include native device management functions and, instead, the operating system 166 grants the agent application 121 the ability to adjust settings on or otherwise configure the client device 20. The agent application 121 for Android® can thus be configured to perform some operations on behalf of the PIV-D application 130. Additionally, the agent application 121 can perform device configuration tasks that are generally performed by native services of the iOS operating system 166.

First, the agent application 121 can receive a partially populated device profile 180 from the management service 115. The partially populated device profile 180 can include an XML or JSON data structure that does not include a certificate payload. For instance, the partially populated device profile 180 can include settings that can be used to configure or manage a client device 20. Any information pertaining to a credential, however, such as a security certificate 35, is not included in the partially populated device profile 180.

Second, the PIV-D application 130 can authenticate the client device 20, for example, by communicating with a third-party security service 30. In some examples, the PIV-D application 130 can generate a derived credential based at least in part on a type of physical security card used for authentication as well as a particular security vendor. In some examples, the derived credential can include, for example, an X.509 security certificate 35. The PIV-D application 130 can store the derived credential certificate 35, ultimately having a public/private key pair based on a private key generated on the client device 20.

Third, the PIV-D application 130 can provide the derived credential to the agent application 121 locally on the client device 20. In some examples, the PIV-D application 130 can maintain a keychain, and the agent application 121 can query the keychain to access the derived credential.

Fourth, the agent application 121 can modify the partially populated device profile 180 to include the derived credentials, such as an X.509 certificate 35, a cryptographic key, or other required data into the partially populated device profile 180 to generate a fully populated device profile 190. For instance, the PIV-D application 130 can modify the non-populated portion of the XML or JSON data structure to include a credential payload. The credential payload can include XML or JSON schema using variable names and variable values. Finally, the agent application 121 can configure the client device 20 using the fully populated device profile 190. Some types of client devices 20, such as those manufactured by Samsung®, include a security API 1303, which can include Samsung® Knox®. The order of operation can remain the same; however, communications between the PIV-D application 130 and the agent application 121 are first routed through the security API 1303.

Figure 14:
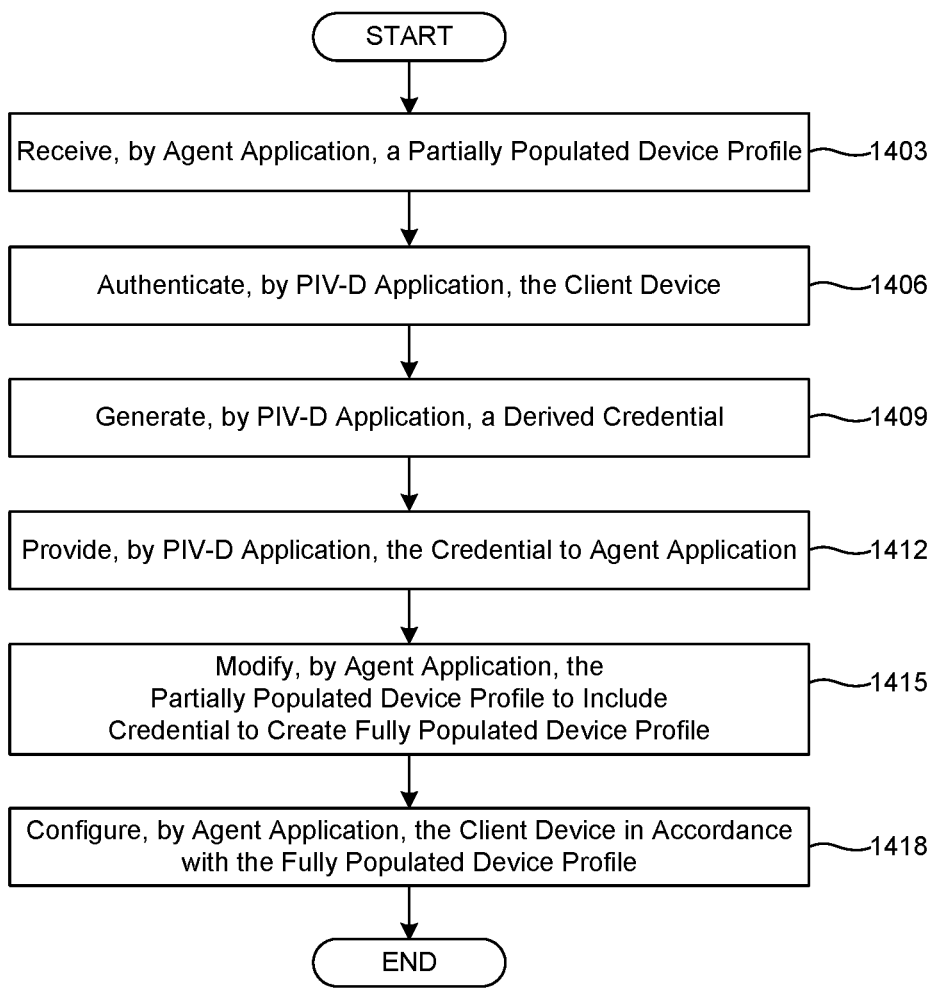
FIG. 14 is a flowchart illustrating functionality implemented by components of the networked environment.

Turning now to FIG. 14, shown is a flowchart that provides one example of the operation of a portion of the client device 20. The flowchart of FIG. 14 can be viewed as depicting an example of elements of a method implemented by the PIV-D application 130 or the agent application 121 executing in the client device 20 according to one or more examples. The separation or segmentation of functionality as discussed herein is presented for illustrative purposes only.

Some operating systems 166, such as Android®, do not include native device management functions and, instead, the operating system 166 grants the agent application 121 the ability to adjust settings on or otherwise configure the client device 20.

Beginning with step 1403, the agent application 121 can receive a partially populated device profile 180 from the management service 115. In some examples, the partially populated device profile 180 can include an XML or JSON data structure that does not include a certificate payload. For instance, the partially populated device profile 180 can include settings that can be used to configure or manage a client device 20. Any information pertaining to a credential, however, such as a security certificate 35, is not included in the partially populated device profile 180.

Next, in step 1406, the PIV-D application 130 can authenticate the client device 20, for example, by communicating with a third-party security service 30 using a third-party SDK 309. In some examples, the PIV-D application 130 can generate a private key based at least in part on a type of physical security card used for authentication as well as a particular security vendor. The PIV-D application 130 can then request a third-party security service 30 to authenticate a user of the client device 20. For instance, the PIV-D application 130, using a network call or API call specific to a particular security vendor, can request the third-party security services 30 to provide authentication credentials to the client device 20. The request can include, for example, data stored on a physical security card, such as a PIV or CAC card, a PIN, a password, or other information.

In step 1409, the PIV-D application 130 can generate a derived credential using, for example, information pertaining to an owner of the physical security card. In some examples, the derived credential can include, for example, an X.509 security certificate 35. The PIV-D application 130 can store the derived credential certificate 35, ultimately having a public/private key pair based on a private key generated on the client device 20.

In step 1412, the PIV-D application 130 can provide the derived credential to the agent application 121 locally on the client device 20. In some examples, the PIV-D application 130 can maintain a keychain, and the agent application 121 can query the keychain to access the derived credential.

In step 1415, the agent application 121 can modify the partially populated device profile 180 to include the derived credentials, such as an X.509 certificate 35, a cryptographic key, or other required data into the partially populated device profile 180 to generate a fully populated device profile 190. For instance, the PIV-D application 130 can modify the non-populated portion of the XML, or JSON data structure to include a credential payload. The credential payload can include XML or JSON schema using variable names and variable values.

In step 1418, the agent application 121 can configure the client device 20 using the fully populated device profile 190. Thereafter, the process can proceed to completion.

The client devices 20 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 25, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 20 can include a display 172 upon which a user interface 169 generated by the client application 25 or another application can be rendered. In some examples, the user interface 169 can be generated using user interface data provided by the computing environment 103. The client device 20 can also include one or more input/output devices that can include, for example, a capacitive touchscreen or other type of touch input device, fingerprint reader, or keyboard.

Although the management service 115, the client application 25, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system for distributed profile and key management, comprising:
a client device; and
program instructions executable in the client device that, when executed by the client device, cause the client device to:
receive, by a first client application of the client device, a partially populated device profile, the partially populated device profile generated by a management service remotely located from the client device to configure at least one setting on the client device, the partially populated device profile as generated comprising a credential payload portion having a temporary string or an empty portion;
authenticate, by a second client application of the client device, the client device through communication with a third-party security service;
in response to the client device being authenticated, generate, by the second client application, a credential, wherein the credential is a derived credential, the derived credential being generated using at least one personal identity verification (PIV) card credential;
provide, by the second client application, the credential to the first client application;
modify, by the first client application, the partially populated device profile to include the credential to create a fully populated device profile by replacing the temporary string or inserting the credential to generate the fully populated device profile; and
cause, by the first client application, the client device to be configured in accordance with the fully populated device profile.

2. The system of claim 1, wherein the first client application is an agent application executable on the client device.

3. The system of claim 2, further comprising program instructions executable in the client device that, when executed by the client device, cause the client device to encrypt, by the agent application, the fully populated device profile.

4. The system of claim 3, further comprising program instructions executable in the client device that, when executed by the client device, cause the client device to send, by the agent application, the fully populated device profile to the management service.

5. The system of claim 1, wherein the client device is configured in accordance with the fully populated device profile using at least one device management feature of an Android® operating system.

6. The system of claim 1, wherein the derived credential is an X.509 public key certificate.

7. A non-transitory computer-readable medium for distributed profile and key management embodying program code executable in a client device that, when executed by the client device, causes the client device to:
receive, by a first client application of the client device, a partially populated device profile, the partially populated device profile generated by a management service remotely located from the client device to configure atleast one setting on the client device, the partially populated device profile as generated comprising a credential payload portion having a temporary string or an empty portion;

authenticate, by a second client application, the client device through communication with a third-party security service;

in response to the client device being authenticated, generate, by the second client application, a credential, wherein the credential is a derived credential, the derived credential being generated using at least one personal identity verification (PIV) card credential;

provide, by the second client application, the credential to the first client application;

modify, by the first client application, the partially populated device profile to include the credential to create a fully populated device profile by replacing the temporary string or inserting the credential to generate the fully populated device profile; and cause, by the first client application, the client device to be configured in accordance with the fully populated device profile.

8. The non-transitory computer-readable medium of claim 7, wherein the first client application is an agent application executable on the client device.

9. The non-transitory computer-readable medium of claim 8, further comprising program code executable in the client device that, when executed by the client device, causes the client device to encrypt, by the agent application, the fully populated device profile.

10. The non-transitory computer-readable medium of claim 9, further comprising program code executable in the client device that, when executed by the client device, causes the client device to send, by the agent application, the fully populated device profile to the management service.

11. The non-transitory computer-readable medium of claim 7, wherein the client device is configured in accordance with the fully populated device profile using at least one device management feature of an Android® operating system.

12. The non-transitory computer-readable medium of claim 7, wherein the derived credential is an X.509 public key certificate.

13. A computer-implemented method for distributed profile and key management, comprising:

receiving, by a first client application of the client device, a partially populated device profile, the partially populated device profile generated by a management service remotely located from the client device to configure at least one setting on the client device, the partially populated device profile as generated comprising a credential payload portion having a temporary string or an empty portion;

authenticating, by a second client application, the client device through communication with a third-party security service;

in response to the client device being authenticated, generating, by the second client application, a credential, wherein the credential is a derived credential, the derived credential being generated using at least one personal identity verification (PIV) card credential;

providing, by the second client application, the credential to the first client application;

modifying, by the first client application, the partially populated device profile to include the credential to create a fully populated device profile by replacing the temporary string or inserting the credential to generate the fully populated device profile; and configuring, by the first client application, the client device in accordance with the fully populated device profile.

14. The computer-implemented method of claim 13, wherein the first client application is an agent application executable on the client device.

15. The computer-implemented method of claim 14, further comprising encrypting, by the agent application, the fully populated device profile.

16. The computer-implemented method of claim 15, further comprising sending, by the agent application, the fully populated device profile to the management service.

17. The computer-implemented method of claim 13, wherein the client device is configured in accordance with the fully populated device profile using at least one device management feature of an Android® operating system.

* * * * *